US008457664B2

(12) United States Patent
Russell et al.

(10) Patent No.: US 8,457,664 B2
(45) Date of Patent: Jun. 4, 2013

(54) TERMINATING SMS MESSAGES IN LTE

(75) Inventors: Nick Russell, Newbury (GB);
Christopher David Pudney, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 396 days.

(21) Appl. No.: 12/800,708

(22) Filed: May 20, 2010

(65) Prior Publication Data

US 2010/0323727 A1 Dec. 23, 2010

(30) Foreign Application Priority Data

May 20, 2009 (GB) .................................. 0908694.3

(51) Int. Cl.
*H04W 4/00* (2009.01)
(52) U.S. Cl.
USPC ........ 455/466; 455/432.1; 455/433; 455/445; 370/351; 370/352; 370/355; 370/356
(58) Field of Classification Search
USPC ................ 455/414.2, 414.3, 466, 457, 456.1, 455/456.2, 456.6, 417, 432.1, 433, 445; 370/351, 352, 355, 356, 401
See application file for complete search history.

(56) References Cited

U.S. PATENT DOCUMENTS

| 2005/0002407 A1 | 1/2005 | Shaheen et al. |
| 2007/0117577 A1 | 5/2007 | Harris |

FOREIGN PATENT DOCUMENTS

| EP | 2046085 A1 | 4/2009 |
| EP | 2136517 A1 | 12/2009 |
| WO | WO03/005738 A2 | 1/2003 |
| WO | WO 2005/036902 A2 | 4/2005 |
| WO | WO2009/056932 A2 | 5/2009 |
| WO | WO2010/0033398 A1 | 3/2010 |

OTHER PUBLICATIONS

Vodafone, "Unnecessary signalling in SMS over IP", 3GPP TSG SA WG2 Meeting #71, TD S2-091091, 3rd Generation Partnership Project (3GPP), Mobile Competence Centre, Feb. 16-20, 2009, XP050333502.
GSM, 3GPP: "Technical Specification Group Core Network and Terminals; Technical realization of the Short Message Service (SMS)", 3GPP TS 23.040 V8.4.0, Release 8, Mar. 2009, pp. 109-132, XP002593799.
Vodafone, Discussion on the technical aspects of "Native SMS over LTE", 3GPP TSG SA WG2 Meeting #74, TD S2-094610, 3rd Generation Partnership Project (3GPP), Mobile Competence Centre, Jun. 6-10, 2009, XP050356090.

*Primary Examiner* — Kamran Afshar
*Assistant Examiner* — Khalid Shaheed
(74) *Attorney, Agent, or Firm* — Muirhead and Saturnelli, LLC

(57) ABSTRACT

An apparatus for providing communication routing information for a subscriber in a mobile communications network, the subscriber being registered with at least one communication delivery network node, comprising: receiver for receiving a request for communication routing information for a subscriber from a network entity, wherein the communication routing information comprises the network routing address of the communication delivery network nodes which the subscriber is registered with; means for determining the capabilities of the network entity, the capabilities comprising the number of communication delivery network node routing addresses manageable by the network entity; identifier for identifying the at least one communication delivery network node the subscriber is registered with; comparator for comparing the number of communication delivery network node routing addresses manageable by the network entity with the number of communication delivery network nodes with which the subscriber is registered; and transmitter for delivering communication delivery network node routing information for the subscriber to the network entity wherein the number of communication delivery network node routing addresses provided to the network entity does not exceed the routing capabilities of the network entity.

15 Claims, 5 Drawing Sheets

HLR/HSS

Susbscriber_B

| Node | Address | Registered time | |
|------|---------|-----------------|------|
| MSC 1 | IP 1 | 17.5.2010 | 1410 |
| SGSN 1 | IP 2 | 19.5.2010 | 1820 |
| MME 1 | IP 3 | 19.5.2010 | 1140 |

FIG. 5

TERMINATING SMS MESSAGES IN LTE

The present invention relates to terminating SMS messages for LTE enabled devices and, in particular, to a method and apparatus for improving efficiency in SMS delivery in LTE.

The Short Message Service (SMS) is a popular means of communication over mobile networks in which subscribers can send data, predominantly, text messages across the mobile network to other subscribers. It is now possible to send SMS messages over IP Multimedia Subsystem (IMS), Packet Switched (PS) and Circuit Switched (CS) domains, which can be second generation (2G), third generation (3G) or fourth generation (Long Term Evolution LTE) radio access technologies (RAT).

Fourth generation LTE capable mobile devices typically have radio and processing configurations to enable them to operate on second generation, third generation and LTE mobile networks as well as enabling them to use different transport methods (circuit switched and packet switched). Since the device can operate on these different technologies, often a mobile device will be registered on multiple technology access domains simultaneously. The radio access technology and transport method the device communicates on at any time will be dependent on factors including network signal strengths, the type of data communication required by the device, user preferences etc. Therefore, when delivering communications to the mobile device, the network must make decisions of which transport method to use to carry the communication and thus to which network architecture component to route communication in order to deliver the communication successfully to the subscriber.

In cases where a multi-RAT device is registered with multiple radio access technologies and transport methods, the home location register (HLR/HSS) for the subscriber stores the network addresses of the most recent network architecture components responsible for handling communications to and from the subscriber. In the case of an LTE device which also operates on 2G and 3G networks and can support circuit switched (CS) and packet switched (PS) transport methods, the HLR/HSS for the device will store the addresses of the most recent MSC (CS/PS for 2G), SGSN (CS/PS for 3G) and MME (PS for LTE) with which the device is registered. The SGSN and MME may, in fact, be the same entity; either with the same IP address or even with different addresses (e.g. different IP addresses, or one IP address and one E.164 address), and this is conveyed to the HLR/HSS in standard MME/SGSN-HLR/HSS signalling.

In certain situations, the device can switch between radio access technologies without informing the HLR/HSS, in particular when switching into or out of LTE to/from either 2G or 3G. This is known as "Idle-mode Signalling Reduction (ISR). In this cases, the HSS will not have been updated as to which network node is currently responsible for handling communications to and from the mobile device and so may expect the MSC to be responsible for the device's communications when the device is, in fact, communicating through the MME.

In the network architecture for SMS delivery, when a sending party sends a Short Message (SM) to a target party, the sending party's home network provides the SM to either the home network or serving network of the target party and waits for confirmation that the SM has been delivered successfully. In the former case, the home network of the target party takes responsibility for delivering the message and also takes responsibility for retrying in the case of a delivery failure. In the latter case it is the sending party's home network that takes responsibility. However, this case limits the mobile technology access domains to which the SM can be delivered to PS and CS.

When the network has a message for delivery to a subscriber, it requests the network address with which the subscriber is currently registered from the HSS of the target subscriber. The HSS will deliver the address of the node with which it believes the subscriber is currently communicating through. In the situation in which the subscriber has switched to a different technology but not updated the HSS i.e ISR is active, for example when the subscriber has switched into LTE from 2G or 3G network that is using an SGSN that is not the same entity as the MME, the HSS will likely provide just the addresses of the MSC and/or SGSN with which the subscriber was most recently registered and not the address of the MME. In such a situation, the SM will be delivered to the MSC or SGSN. Since the subscriber is no longer residing on the MSC or SGSN, the SMS will not be delivered. Currently, a mechanism does not exist in LTE for ensuring delivery of an SM when ISR is deployed and is active.

Embodiments of the present invention overcome these problems with the prior art by allowing the HLR/HSS to take an intelligent view on supporting SMS delivery. In particular, they recognise that an LTE enabled subscriber which is registered with more than one node may be active on any of those nodes. Such HLR/HSS also recognise that network entities which are responsible for delivering SMS messages (SMS Gateway MSCs (SMS-GMSC) may support only 1 node address whilst others support 2 node addresses, but currently do not support 3 or more delivery addresses. In such case, the HLR/HSS will only provides the SMS-GMSC with a number of addresses that they are able to handle.

Further embodiments allow the HLR/HSS to prioritise the network nodes with which the subscriber is registered and attempt to identify which of the nodes the subscriber is more likely to be communicating through. Such intelligent decisions assist in providing more efficient signalling across the network by increasing the probability that an SMS is successfully delivered to a target subscriber in fewer attempts.

By including new intelligence into the HLR/HSS, SMS delivery across the entire network can be improved without having to make any changes or upgrades to the SMS-GMSCs in the network. Therefore, these embodiments also provide a cost effective way to upgrade SMS delivery techniques across the network.

A first embodiment of the invention provides a method for providing communication routing information for a subscriber in a mobile communications network, the subscriber being registered with at least one communication delivery network node, and comprises the steps of: receiving a request for communication routing information for a subscriber from a network entity, wherein the communication routing information comprises the network routing address of the communication delivery network nodes which the subscriber is registered with; determining the capabilities of the network entity, the capabilities comprising the number of communication delivery network node routing addresses manageable by the network entity; identifying the at least one communication delivery network node the subscriber is registered with; comparing the number of communication delivery network node routing addresses manageable by the network entity with the number of communication delivery network nodes with which the subscriber is registered; and delivering communication delivery network node routing information for the subscriber to the network entity wherein the number of communication delivery network node routing addresses provided to the network entity does not exceed the routing capabilities of the network entity.

This embodiment provides the advantage that a requesting SMS-GMSC is only provided with the number of addresses that it is able to handle. Therefore, if a SMS-GMSC is only able to handle a single address it is only provided with a single address.

A second embodiment of the invention, when the routing capabilities of the network entity are exceeded by the number of communication delivery network nodes to which the subscriber is registered, comprises the further step of: recording that communication delivery network node routing information has been provided to the network entity and identifying the network routing addresses which have been provided.

The embodiment enables the HSS/HLR to recognise what information has already been sent to a requesting SMS-GMSC and so it recognises which network nodes the SMS-GMSC will have attempted to deliver the SMS to.

A third embodiment of the invention, on receiving a further request for network routing information for the subscriber from the network entity, comprises the further steps of: identifying whether communication delivery network node routing information for the subscriber has previously been provided to the network entity; identifying whether any network node routing information was not previously provided to the network; comparing the remaining number of network nodes with the routing capabilities of the network entity; delivering remaining network node routing information to the network entity wherein the number of network nodes provided to the network entity does not exceed the routing capabilities of the network entity; and recording that network node routing information has been provided to the network entity and identifying the routing information which has been provided.

This embodiment links the intelligence within the HLR/HSS to the delivery actions of the SMS-GMSC. If the HLR/HSS receives a further request for a network address it is able to recognise that it has already provided routing information to the SMS-GMSC and, assuming from the repeated request that the initial delivery attempts failed, the HLR/HSS is able to send address information for other network nodes which may be able to deliver messages to the subscriber. The step of keeping a record of previous communications with SMS-GMSC helps to avoid continuously sending addresses for network nodes for which message delivery has already failed.

In accordance with a fourth embodiment of the invention, the network nodes to which the subscriber is registered are prioritised.

This embodiment has the advantage of determining which network nodes are most likely to be successful in delivering messages to the subscriber.

In accordance with a fifth embodiment of the invention, network node routing information is provided to the network entity for network nodes in order of priority.

Such embodiments improve the efficiency of the system by providing the SMSC with details of the network nodes which are most likely to be successful in delivering the messages first.

In accordance with a sixth embodiment of the invention, the network nodes to which the subscriber is registered are prioritised in dependence on the time at which the subscriber registered with the network node.

Such embodiments assume the subscriber is most likely to be active on a network node that he has most recently registered with.

In accordance with a seventh embodiment of the invention, the network nodes to which the subscriber is registered are prioritised in dependence on the country and network of the network node.

In accordance with an eighth embodiment of the invention the time at which network node routing information is provided to the network entity is recorded and, on receiving a further request for network node information delivering the remaining network node information in dependence on the time elapsed since the routing information was provided to the network entity not exceeding a predefined time limit.

Such embodiments enable the HLR/HSS to assess whether the further request from the SMSC is related to the delivery of the same message as the initial request or whether it is related to delivery of a new message based on the timing of the further request. If it is related to the same message then the HLR/HSS can assume that the SMSC has already attempted to deliver the message to the subscriber through the network nodes included with its initial response. However, if it is a new request, then the SMSC should most usefully be provided with the network nodes to which the subscriber is most likely to be communicating through. If the interval between requests is very small then the HLR/HSS can assume that this is in response to failed delivery attempts through the initial network nodes. However, if there is a significant time interval between the requests then the request is more likely to be related to a separate SMS entirely.

In preferred embodiments the network entity is a SMS router (SMSC).

The invention is defined in its various aspects in the appended claims.

Embodiments of the present invention are now described with reference to the accompanying figures in which:

FIG. 5 shows a subscriber record stored in an HLR/HSS.

Figure 1:
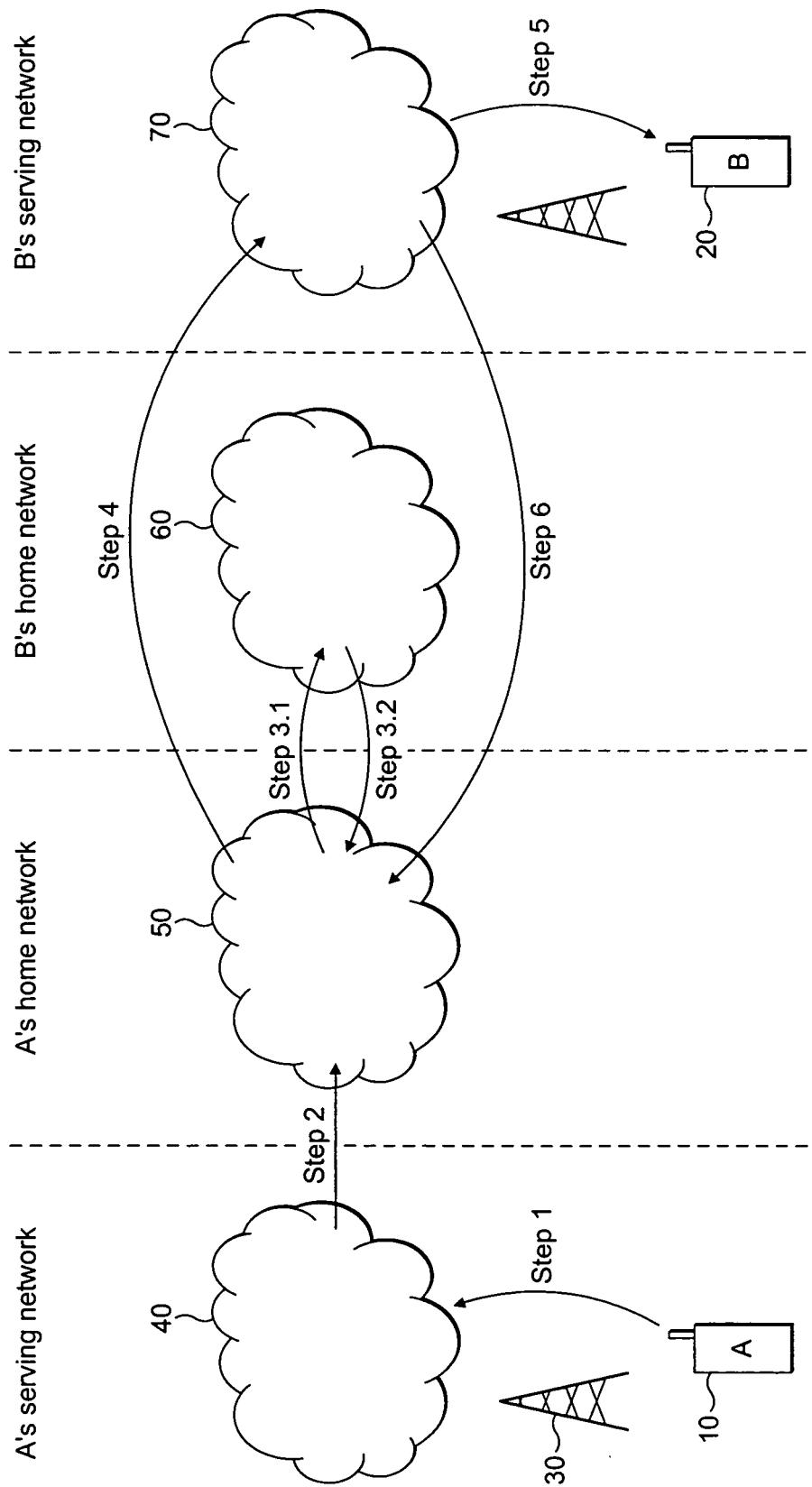
FIG. 1 shows the delivery of an SM between communication networks, where the receiving party's home network takes responsibility for delivering the message.

FIG. 1 shows the delivery route of an SM between two mobile communication devices. Mobile device A (10) sends an SM to mobile device B (20). The user of mobile device A creates an SM, selects the target recipient (mobile device B) and hits the send key on his device. Mobile device A is operating within a local mobile network 40. At step 1, the SM and the Mobile Station ISDN Number (MSISDN) of the target recipient are transmitted from the device to the local mobile network via the device's serving base station 30. The local network 40 receives the SM, and MSISDN of the target subscriber B. The local network 40 also holds the IMSI of the sending party and this is associated with the SM and target MSISDN.

In order to route the message, the local network 40 identifies subscriber A's home network 50 from A's IMSI. At step 2, A's serving network forwards the SM, the IMSI of subscriber A, and the MSISDN of target subscriber A to A's home network 50. This information is forwarded to the Short Message Service Centre (SMSC) of A's home network.

On receiving the SM, the IMSI of subscriber A, and the MSISDN of the target subscriber B, A's home network 50 uses B's MSISDN to identify B's home network 60. At Step 3.1 and 3.2, A's home network retrieves from B's home network 60 the currently serving node(s) where subscriber B is currently residing, as well as subscriber B's IMSI. A's home network then forwards the SM, the IMSI of subscriber B, and the MSISDN of subscriber B to B's serving network 70.

B's serving network 70 is then responsible for delivering the SM to subscriber B at Step 5. Once the SM has been delivered successfully to B, B's serving network 70 confirms to A's home network 50 that the SM has been delivered successfully at Step 6.

In FIG. 1, A's serving network, A's home network, B's home network and B's serving network are depicted as different networks. However, some or all of the networks may, in fact, be the same network.

Before B's home network 60 can instruct to which node subscriber A's home network 50 should deliver the SM, it must identify the current serving network node upon which subscriber B is residing. Depending on which radio access technology subscriber B is currently registered with and which transport method B is using, this may be CS on 2G or 3G (MSC), PS on 2G or 3G (SGSN) or PS on LTE (MME) or IMS (S-CSCF). This information is stored in a Home Location Register/Home Subscriber Server (HLR/HSS) in subscriber B's home network 60.

The HLR/HSS of a network is a database which stores the current routing information of all its registered subscribers. The MSISDN of the subscriber is stored along with the IMSI and the network address of the network nodes which are currently managing traffic to and from the subscriber. The HLR/HSS stores network node address information for the network subscribers on all domains on which the subscriber is currently registered, including MSC address for Circuit Switched traffic, SGSN for 2G/3G Packet Switched traffic, MME for LTE Packet Switched traffic and S-CSCF for IMS traffic.

The address data is kept up to date by the HLR/HSS from the respective serving nodes. For example, in the Circuit Switched domain, when the subscriber moves into a cell supported by a different MSC, the location update procedure is initiated to the HLR/HSS for the subscriber and the HLR/HSS stores the received node address where the device is now residing. Every time the subscriber changes location to a new MSC, the HLR/HSS keeps a record of this and so it knows its current location. Therefore, when a network needs to know the current network address for the subscriber, the HLR/HSS for the subscriber can provide it with that information. Similar updates are provided in 2G and 3G via the SGSN and provided in LTE via the MME. However, with the IMS domain for the current S-CSCF does not change after registration (at least, not until after a further registration/re-registration).

Figure 2:
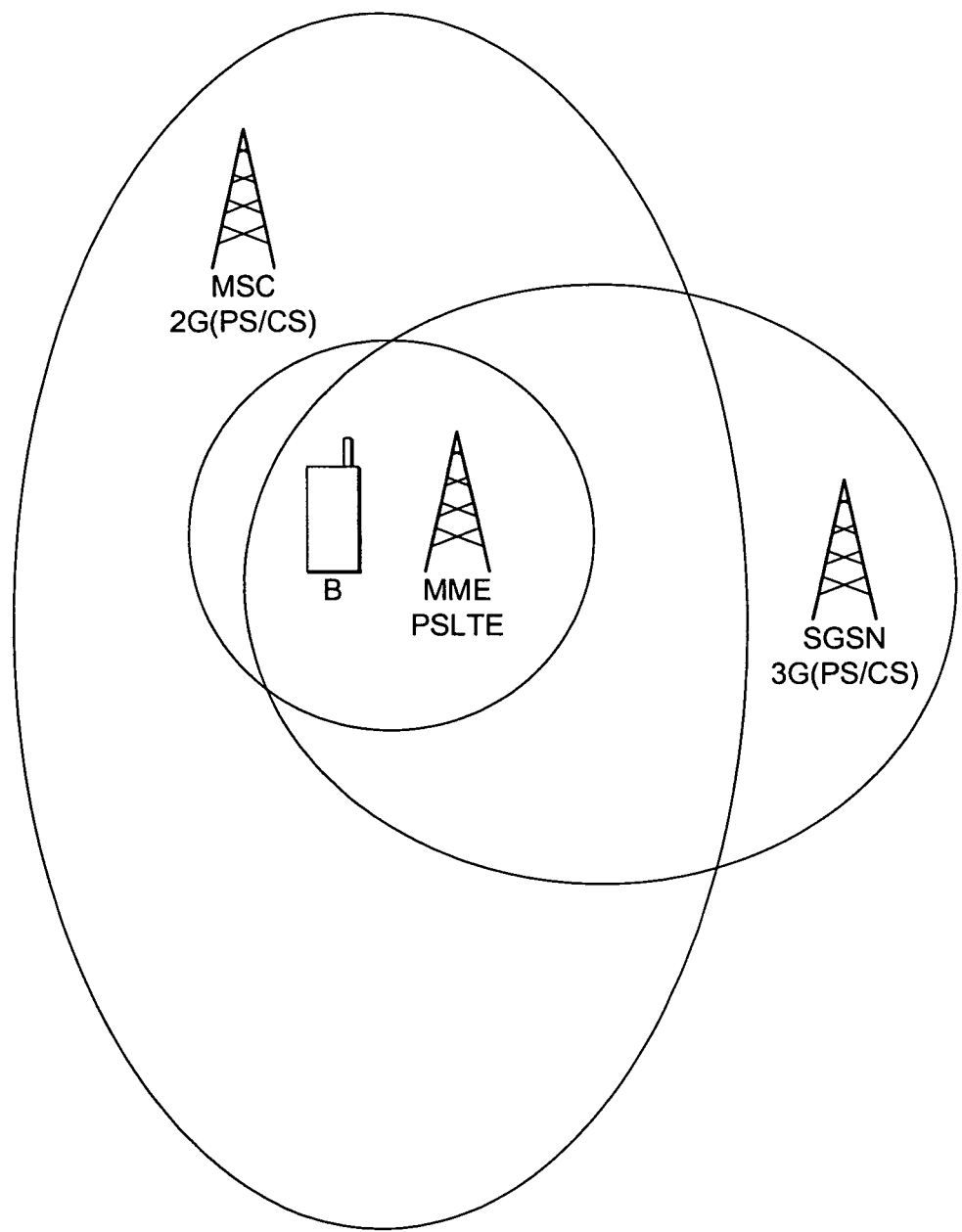
FIG. 2 shows a subscriber device B located within range of different radio access technology networks.

FIG. 2 shows a more detailed view of network coverage for a mobile device B which is in an area currently served by 2G, 3G and LTE networks. The HLR/HSS for B stores a record for B including its IMSI against the network addresses of each network node responsible for handling traffic to B. In certain cases the MME and SGSN nodes will be a single combined node and in this case, this is explicitly conveyed to the HLR/HSS in the update location procedure by means of a discrete flag. The HLR/HSS will store this information.

As the device B moves location and moves into areas served by different network nodes, the details stored in the HLR/HSS will be updated as the device moves into areas controlled by different MSCs, SGSNs and MMEs and registers with these different nodes. If B moves from a location served by 2G and 3G (MSC, SGSN) and LTE (MME) into another area served by different network nodes MSC, SGSN and LTE it will register with the new MSC, SGSN and MME which serve its new location. The MSC, SGSN and MME addresses will be updated in the HLR/HSS. However, if the device moves into a location only served by CS and PS 2G and 3G then the device will register with new MSC and SGSN and these addresses will be updated in the HLR/HSS. In this situation, because the new location is not served by LTE, the device will not register with a new MME because there is not one serving its current location. Although the previous MME no longer serves the device, since the device has not reregistered, the address of the previous MME remains stored in the HLR/HSS against device B and is not overwritten or deleted.

Therefore, in this situation, the MME address stored against it is out of date but remains in the HLR/HSS record. Any communications directed to that MME for subscriber will be unable to reach subscriber B and so delivery will fail.

SMS-GMSCs have been used in network architectures for many years. Legacy SMS-GMSCs and SMS-GMSCs manufactured by different manufacturers may operate in different ways and handle different types of information. For example, some legacy SMS-GMSCs may only support a single delivery address of network node (believing that node to be an MSC). Such SMS-GMSCs can only be provided with a single node address. Any further addresses will be ignored. Other, more modern, SMS-GMSCs may support more than one delivery address for delivering SMS messages.

Figure 3:
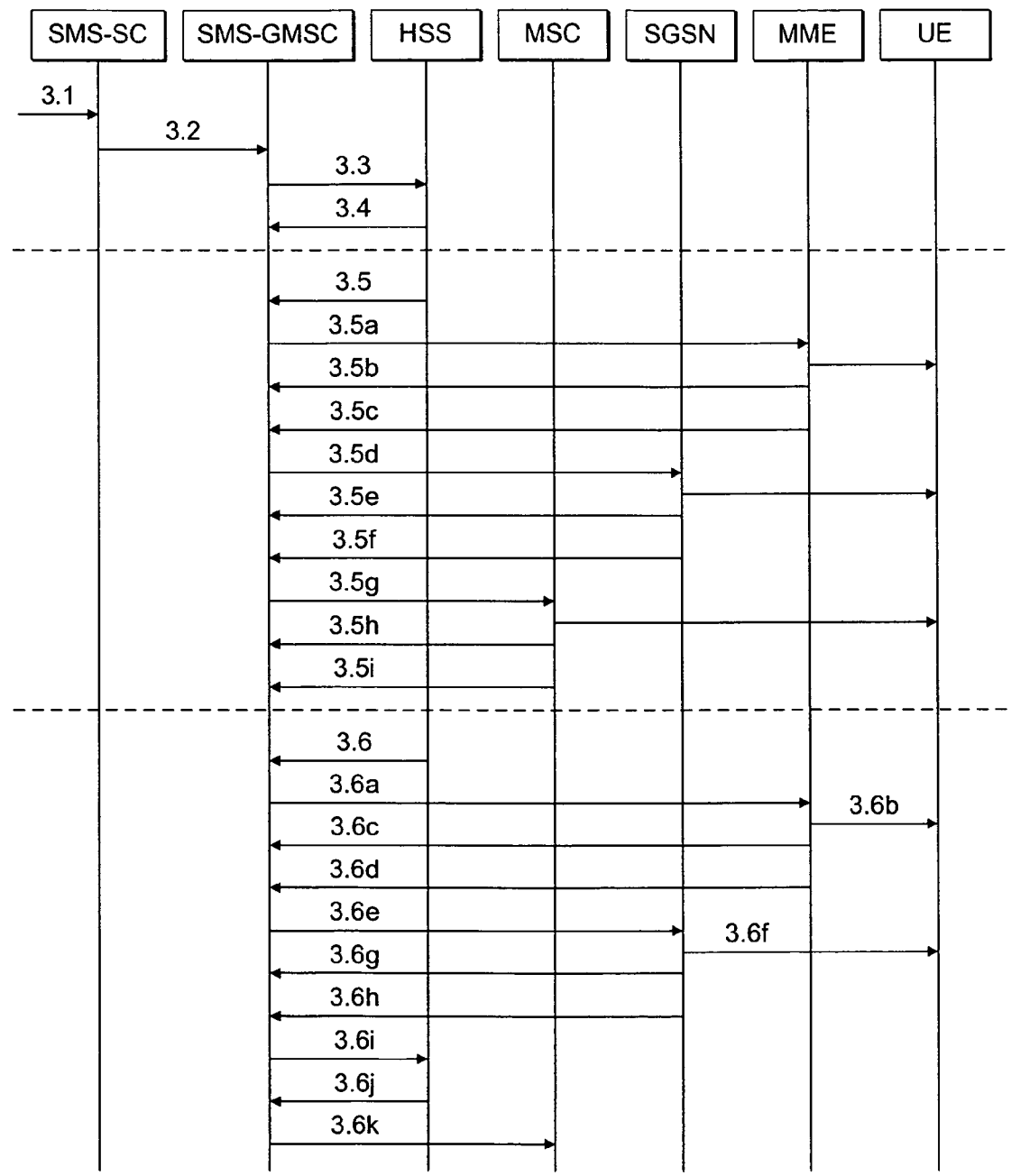
FIG. 3 shows message flows between network components in an embodiment of the invention.

FIG. 3 shows a more detailed view of the architectural network components involved in SMS delivery and the message flows between the components. At step 3.1 the SM from the sending party is received at the sending party's SMS Service Centre (SMS-SC) along with the MSISDN of the target party. The IMSI of the sending party is also associated with this data. This step is equivalent to step 3 of FIG. 1.

On receipt of the incoming message, the SMS-SC first determines to which network the target party is registered using the MSISDN of the target party. MSISDN includes: a country code, for example 44, which identifies the country of the subscriber's home network; a network code which identifies the network to which the subscriber is registered; and a subscriber identity which allows the subscriber's home network to recognise him uniquely. The SMS-SC checks the mobile country code and mobile network code to confirm the home network of the target subscriber. The SMS-SC holds a database of addresses for each network and it will interrogate its database for the network address of the target subscriber's home network. If the target party's network is part of a Mobile Number Portability (MNP) community, then the last transit network before the target party's network typically takes care of finding the correct, or "ported-to", network.

Historically, in SMS standards, the sending party's network has taken responsibility for delivering the SM. It obtains the network delivery address for the target subscriber and the IMSI for the target subscriber by contacting the home network of the target device and asking for this information.

The node in the network responsible for forwarding the message and obtaining the information from the home network of the target subscriber is the SMS-GMSC. At step 3.2 the SMS-SC forwards the SM along with the MSISDN of the target subscriber to the SMS Gateway MSC (SMS-GMSC). In FIG. 3, the SMS-SC and SMS-GMSC are shown as separate entities but, in certain implementations, these may be incorporated into the same physical entity.

The SMS-GMSC looks-up the network address for the target subscriber's HLR/HSS and then interrogates the HLR/HSS for the current node address(es) associated with the target subscriber B by providing B's IMSI at 3.3.

Figure 4:
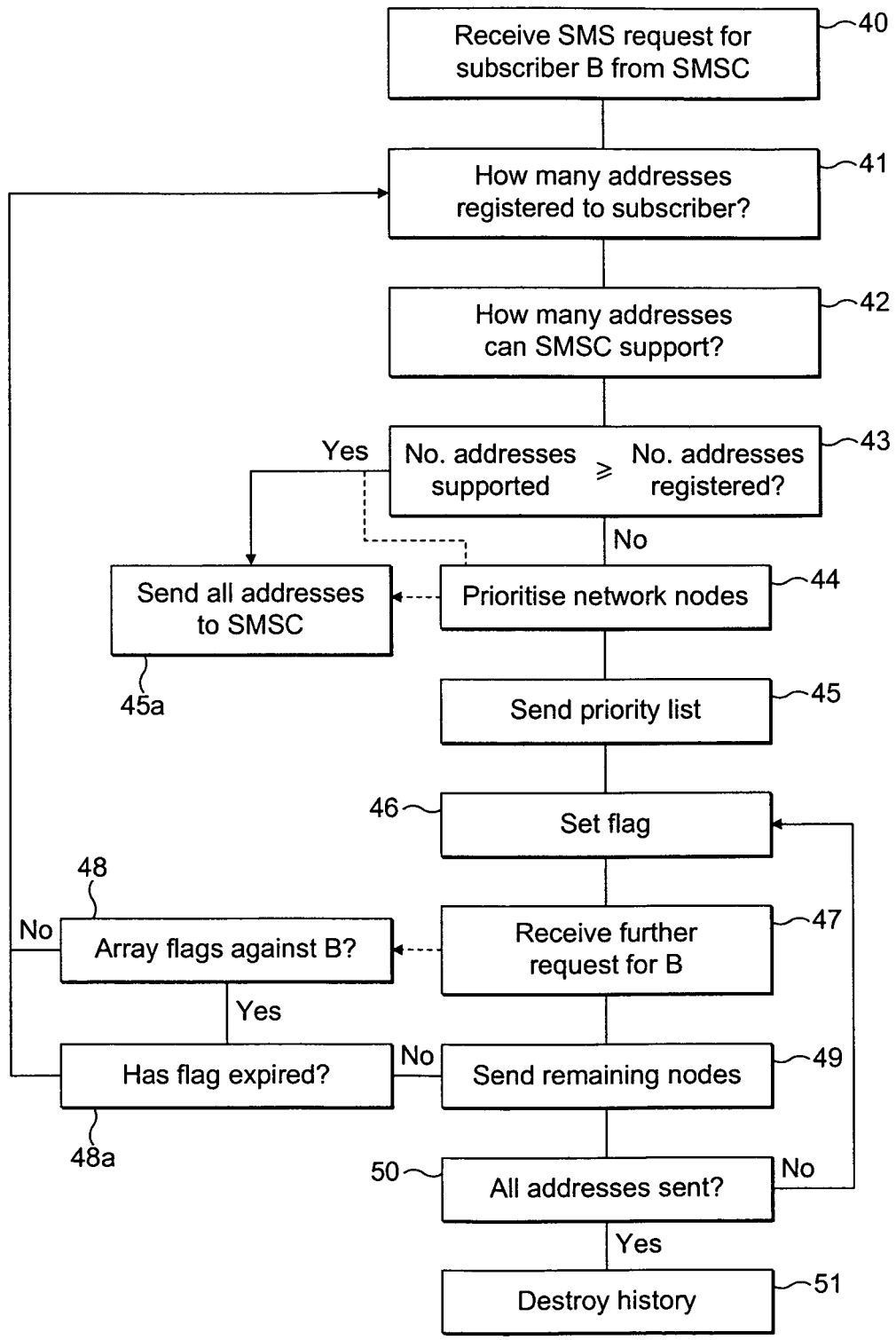
FIG. 4 shows the steps taken in an HLR/HSS in an embodiment of the invention.

FIG. 4 shows the steps taken at the HLR/HSS. On receipt of the request by the SMS-GMSC at 40, the HLR/HSS determines from the received MAP_SendRoutingInfoForSM_Req the capabilities of the SMS-GMSC, in particular, how many addresses the SMS-GMSC can support for attempting delivery of the SMS at 41. This is determined by examining the current MAP Application Context version that the received MAP_SendRoutingInfoForSM_Req is using, plus any other data available e.g. static configuration, some other indication in the MAP_SendRoutingInfoForSM_Req as to how many delivery nodes are supported.

At 41, the HLR/HSS then checks it record for subscriber B and identifies how many network nodes are currently registered to the subscriber. As discussed above, if the subscriber's address and account support CS and PS transport methods and 2G, 3G and LTE radio access technologies, then there may be up to three network nodes registered against the subscriber.

This solution proposed herein ignores the case where the subscriber is registered in IMS. This is because in the case where subscriber B's home network supports IMS, it will have an IP-SM-GW deployed, which takes on responsibility of delivery of an SM from the SMS-GMSC, as specified in existing standards based solutions.

Of course, the order in which the HLR/HSS checks the capabilities of the SMS-GMSC and the number of networks nodes registered against the subscriber is not important.

Once the HLR/HSS has determined the number of addresses supported by the SMS-GMSC and the number of network nodes registered against the subscriber, it compares these values at 42.

If the number of addresses supported by the SMS-GMSC is less or equal to the number of addresses registered at the HLR/HSS then all network node addresses can be returned to the SMS-GMSC at 43 (step 3.4 on FIG. 3). However, if the number of registered node addresses exceeds the number supported by the SMS-GMSC then the HLR/HSS must select which node address or addresses (depending on how many the SMS-GMSC supports) to send to the SMS-GMSC.

In order to decide which node addresses to send to the SMS-GMSC at 3.4 the HLR/HSS creates a priority list for the network nodes registered against the subscriber at 44. This priority list may be created and used whether or not the SMS-GMSC supports sufficient node addresses. There are several options that the HLR/HSS may use to determine the order of priority of the network nodes for the subscriber as defined below:

In a first example, the order of priority may be dictated by the network and be consistent for all subscribers in the network. For example, the network might dictate that, for a device which is capable of operating on 2G, 3G and LTE networks, the first priority network node is the MME (for LTE), second priority is SGSN (for PS 2G and 3G) and third priority is the MSC (for CS 2G and 3G).

In a second example, the order of priority might be specific to a particular user and either defined by the subscriber or the network. For example, the subscriber might select that he always wants his first priority to be the SGSN followed by MSC and finally MME. Alternatively, the network might select an order for priority based on the subscriber's subscription e.g. data only subscription would mean that the network may never use the MSC.

In a third embodiment, the HLR/HSS considers the time stamps against when the network node addresses were last updated. This information is stored within the HLR/HSS against the node addresses for the subscriber. Every time a subscriber registers with a new network node, the time at which that registration is made is stored against the network node address. FIG. 5 shows the network node information stored in the HLR/HSS for subscriber B. Subscriber B can support CS and PS transport methods and can support 2G, 3G and LTE radio access technologies and so the HLR/HSS holds a network node record for B for three network nodes. However, the time of registration on each node is different. The HLR/HSS uses the time stamps against the node registrations to prioritise the network nodes. Since subscriber B registered with SGSN1 most recently (1820 on 19 May 2010 compared with 1140 on 19 May 2010 for MME1 and 1410 on 17 May 2010 for MSC1) the HLR/HSS can determine that, since the most recent registration is SGSN1, there is a high probability that this is the node on which the subscriber is most likely to be active. The second most recent registration (i.e. MME1) will be the second priority and the oldest registration (MSC1) will be the lowest priority.

In a fourth embodiment, the HLR/HSS checks the PLMN ID of the nodes stored against the subscriber. If there are any differences in the PLMN IDs then the nodes associated with the older PLMN(s) can be ignored. For example, if a subscriber's UK subscription has a recent MSC and SGSN address in Sweden but a much older MME address in USA, there is a high probability that the subscriber is located in Sweden and not USA and so the MME address can be ignored, or, at least, given lowest priority.

In the case when the SMS-GMSC can support the number of addresses registered to the subscriber, preferably, the priority of the addresses is sent to the SMS-GMSC with the addresses i.e. by ordering them with highest priority first on the list, at 45*a*. On receipt of the addresses, the SMS-GMSC can attempt to deliver the SM to the subscriber B using the priority listing.

FIG. 3 shows an example of when the SMS-GMSC is able to support three network node addresses and the order of priority for the subscriber B is MME, followed by SGSN, followed by MSC. On receipt of the node addresses at 3.4, the SMS-GMSC identifies the priority order. At 3.5*a* it attempts delivery of the message to the first priority node, MME. If delivery is successful, MME confirms delivery back to the SMS-GMSC at 3.5*b*. However, if delivery fails, a delivery failure message is sent to the SMS-GMSC at 3.5*c*. SMS-GMSC then looks for the second priority network node, i.e. SGSN, and attempts to deliver the SM at 3.5*d*. If delivery is successful, SGSN confirms successful delivery back to the SMS-GMSC at 3.5*e*. However, if delivery fails, a delivery failure message is returned to the SMS-GMSC at 3.5*f*. SMS-GMSC then looks for the third priority network node, i.e. MSC, and attempts to deliver the SM at 3.5*g*. If MSC successfully delivers the message it confirms delivery to SMS-GMSC at 3.5*h*. If delivery fails, MSC returns a delivery failure message to SMS-GMSC at 3.5*i*. If all delivery via all nodes is unsuccessful, then the SMS-GMSC initiates the standard procedures for an "absent subscriber" i.e. contacts the HLR/HSS to inform it when the subscriber becomes available again.

If the number of nodes with which the subscriber appears to be registered is greater than the number of addresses supported by the SMS-GMSC at 43, the HLR/HSS decides which node addresses to transmit to the SMS-GMSC at 44. Preferably, the HLR/HSS will transmit those addresses in the order of priority. In the case that the SMS-GMSC supports two node addresses and the HLR/HSS has three nodes registered against the subscriber, the HLR/HSS will transmit the first and second priority node addresses at 45 (3.6 on FIG. 3). In the case that the order of priority is MME, followed by SGSN, followed by MSC, the MME and SGSN addresses will be sent to the SMS-GMSC and the order of priority will be provided to the SMS-GMSC.

On transmission of the MME and SGSN addresses to the SMS-GMSC, the HLR/HSS sets a flag against the subscriber record to indicate that it has sent the MME and SGSN node addresses to the SMS-GMSC at 46. In further embodiments, the HLR/HSS may also record the time at which the addresses were sent to the SMS-GMSC.

On receipt of the node addresses from the HLR/HSS, the SMS-GMSC will attempt to deliver the SM to the subscriber to the node addresses in order of preference. Therefore, at 3.6*a* the SMS-GMSC attempts to deliver the SM to MME. If delivery is successful at 3.6*b*, MME sends a delivery complete message to SMS-GMSC at 3.6*c* and SMS-GMSC can disregard the SGSN address. However, if MME cannot deliver the SM, MME sends a delivery failure message at 3.6*d*. On receipt of the delivery failure message, SMS-GMSC attempts to deliver the SM to the subscriber at SGSN at 3.6*e*. If delivery is successful at 3.6*f*, SGSN returns a delivery complete message to SMS-GMSC at 3.6*g*.

However, if SGSN is unable to deliver the SM it returns a delivery failure message at 3.6*h*. In this situation SMS-GMSC asks the HLR/HSS to inform it when the subscriber becomes available again, upon which, the HLR/HSS immediately notifies the SMS-GMSC that the subscriber is available. The SMS-GMSC then contacts the HLR/HSS again requesting the node address for SMS for subscriber B at 3.6*i*. On receipt of the request from SMS-GMSC (step 47 of FIG. 4) and on retrieving the record for subscriber B, HLR/HSS identifies the flag on the subscriber record at 48. The flag indicates that HLR/HSS has already transmitted node addresses for MME and SGSN but identifies that subscriber B is also registered at MSC. Therefore, the HLR/HSS transmits the node address of the third priority node, MSC, to the SMS-GMSC at 49 (3.6*j* on FIG. 3). At this point the HLR/HSS can record that it has sent the third priority node address at 49. If any node addresses remain unsent at this point, the HLR/HSS can set a further flag to record its actions at 50. Otherwise, if all addresses have been sent, the HLR/HSS can delete its history at 51.

On receipt of the node address for the MSC at 3.6*j*, the SMS-GMSC can attempt to deliver the SM to the subscriber B at the MSC at 3.6*k*.

In preferred embodiments of the invention, in the situation when the HLR/HSS receives a request for a node address and identifies a flag against the subscriber record, the HLR/HSS will check the time at which the initial node address data was transmitted at 48*a*. If the elapsed time period exceeds a predefined time period then the HLR/HSS may ignore the flag and retransmit the priority node addresses. For example, in the situation where the SMS-GMSC has received the priority node addresses and successfully delivers the SM to the subscriber's device and then receives a new SM at a later time period, on requesting the node address for subscriber B a second time the SMS-GMSC would not wish to receive the third priority node address.

The following are further examples of delivery situations in which a subscriber is registered with MME, SGSN (which may be combined nodes) and MSC, and the delivery priority is MME, followed by SGSN, followed by MSC:

In a first example, if the HSS determines that the mobile is camped on separate MME and SGSN nodes and the SMS-GMSC supports only ONE delivery address then:
 The HSS sends one address, that of the priority node MME, to the SMS-GMSC;
 If the SMS delivery fails, the HSS waits for the SMS-GMSC to set the message waiting flag (in the HSS), then the HSS immediately notifies the SMS-GMSC that the mobile is available and returns the address of the second priority node SGSN to the SMS-GMSC;
 If the SMS delivery fails, it waits for the SMS-GMSC to set the message waiting flag (in the HSS), then the HSS immediately notifies the SMS-GMSC that the mobile is available and returns the third priority node address MSC to the SMS-GMSC.

In example 2, if the HSS determines that the mobile is camped on separate MME and SGSN nodes and the SMS-GMSC supports TWO delivery addresses then:
 The HSS sends the addresses of the MME and SGSN to the SMS-GMSC and, preferably, indicates the order of priority for the two nodes;
 If the SMS delivery fails at both MME and SGSN, HLR/HSS waits for the SMS-GMSC to set the message waiting flag (in the HSS), then the HSS immediately notifies the SMS-GMSC that the mobile is available and returns the address for the third priority node MSC to the SMS-GMSC.

In example 3, if the HSS determines that the mobile is camped on a combined MME and SGSN node and the SMS-GMSC supports only ONE delivery address then:
 The HSS sends the MME/SGSN address to the SMS-GMSC;
 If the SMS delivery fails, it waits for the SMS-GMSC to set the message waiting flag (in the HSS), then the HSS immediately notifies the SMS-GMSC that the mobile is available and returns the third priority node address MSC to the SMS-GMSC.

In a fourth example, if the HSS determines that the mobile is camped on a combined MME and SGSN node and the SMS-GMSC supports TWO delivery addresses then:
 The HSS sends the address of the combined MME and SGSN and the address of the MSC to the SMS-GMSC.

It will be apparent to those skilled in the art that embodiments of the present invention enable the HLR/HSS to make intelligent decisions about the likely availability of subscribers on different network nodes. By prioritising the nodes the SMS-GMSC is able to contact the node which is most likely to be active for the subscriber and, therefore, potentially, reduce signalling across the network.

The invention claimed is:

1. A method for providing communication routing information for a subscriber in a mobile communications network, the subscriber being registered with at least one communication delivery network node, comprising the steps of:
 receiving a request for communication information comprises a network routing address of the communication delivery network nodes which the subscriber is registered with;
 determining the capabilities of the network entity, the routing information for a subscriber from a network entity, wherein the communication routing capabilities comprising the number of communication delivery network node routing addresses manageable by the network entity;
 identifying the at least one communication delivery network node the subscriber is registered with;
 comparing the number of communication delivery network node routing addresses manageable by the network entity with the number of communication delivery network nodes with which the subscriber is registered; and,
 delivering communication delivery network node routing information for the subscriber to the network entity wherein the number of communication delivery network node routing addresses provided to the network entity does not exceed the routing capabilities of the network entity.

2. The method of claim 1 wherein if the routing capabilities of the network entity are exceeded by the number of communication delivery network nodes to which the subscriber is registered, comprising the further step of:
Recording that communication delivery network node routing information has been provided to the network entity and identifying the network routing addresses which have been provided.

3. The method of claim 1 wherein on receiving a further request for network routing information for the subscriber from the network entity comprising the further steps of:
identifying whether communication delivery network node routing information for the subscriber has previously been provided to the network entity;
   identifying whether any network node routing information was not previously provided to the network;
   comparing the remaining number of network nodes with the routing capabilities of the network entity;
delivering remaining network node routing information to the network entity wherein the number of network nodes provided to the network entity does not exceed the routing capabilities of the network entity; and,
   Recording that network node routing information has been provided to the network entity and identifying the routing information which has been provided.

4. The method of claim 1 comprising the further step of prioritising the network nodes to which the subscriber is registered.

5. The method of claim 4 wherein network node routing information is provided to the network entity for network nodes in order of priority.

6. The method of claim 4 wherein the network nodes to which the subscriber is registered are prioritised in dependence on the time at which the subscriber registered with the network node.

7. The method of claim 4 wherein the network nodes to which the subscriber is registered are prioritised in dependence on the country and network of the network node.

8. The method of claim 2 comprising the further step of recording the time at which network node routing information is provided to the network entity and, on receiving a further request for network node information delivering the remaining network node information in dependence on the time elapsed since the routing information was provided to the network entity not exceeding a predefined time limit.

9. An apparatus for providing communication routing information for a subscriber in a mobile communications network, the subscriber being registered with at least one communication delivery network node, comprising:
Receiver for receiving a request for communication routing information for a subscriber from a network entity, wherein the communication routing information comprises a network routing address of the communication delivery network nodes which the subscriber is registered with;
   means for determining the capabilities of the network entity, the capabilities comprising the number of communication delivery network node routing addresses manageable by the network entity;
   identifier for identifying the at least one communication delivery network node the subscriber is registered with;
   comparator for comparing the number of communication delivery network node routing addresses manageable by the network entity with the number of communication delivery network nodes with which the subscriber is registered; and,
   transmitter for delivering communication delivery network node routing information for the subscriber to the network entity wherein the number of communication delivery network node routing addresses provided to the network entity does not exceed the routing capabilities of the network entity.

10. The apparatus of claim 9 further comprising recording means for recording that communication delivery network node routing information has been provided to the network entity and identifying the network routing addresses which have been provided if the routing capabilities of the network entity are exceeded by the number of communication delivery network nodes to which the subscriber is registered.

11. The apparatus of claim 9 further comprising, on receiving a further request for network routing information for the subscriber from the network entity:
Means for identifying whether communication delivery network node routing information for the subscriber has previously been provided to the network entity;
   means for identifying whether any network node routing information was not previously provided to the network;
   comparator for comparing the remaining number of network nodes with the routing capabilities of the network entity;
   means for delivering remaining network node routing information to the network entity wherein the number of network nodes provided to the network entity does not exceed the routing capabilities of the network entity; and,
   recording means for recording that network node routing information has been provided to the network entity and identifying the routing information which has been provided.

12. The apparatus of claim 9 further comprising means for prioritising the network nodes to which the subscriber is registered.

13. The apparatus of claim 12 wherein network node routing information is provided to the network entity for network nodes in order of priority.

14. The apparatus of claim 12 wherein the network nodes to which the subscriber is registered are prioritised in dependence on the time at which the subscriber registered with the network node.

15. The apparatus of claim 10 further comprising means for recording the time at which network node routing information is provided to the network entity and, on receiving a further request for network node information delivering the remaining network node information in dependence on the time elapsed since the routing information was provided to the network entity not exceeding a predefined time limit.

* * * * *